Nov. 20, 1956  R. H. DITTMORE ET AL  2,771,540
SOLDERING TRANSFORMER FOR SPLICING COAXIAL CABLES
Original Filed June 28, 1954  2 Sheets-Sheet 1

INVENTORS
RAY H. DITTMORE
WALTHER RICHTER
DANIEL SHADD
JAMES A. McMILLAN
RUSSELL W. TRICKLE, Jr.

BY *H.B. Willson & Co.*

ATTORNEYS

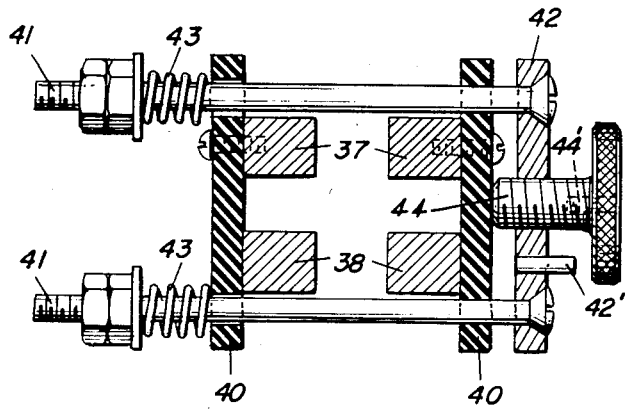
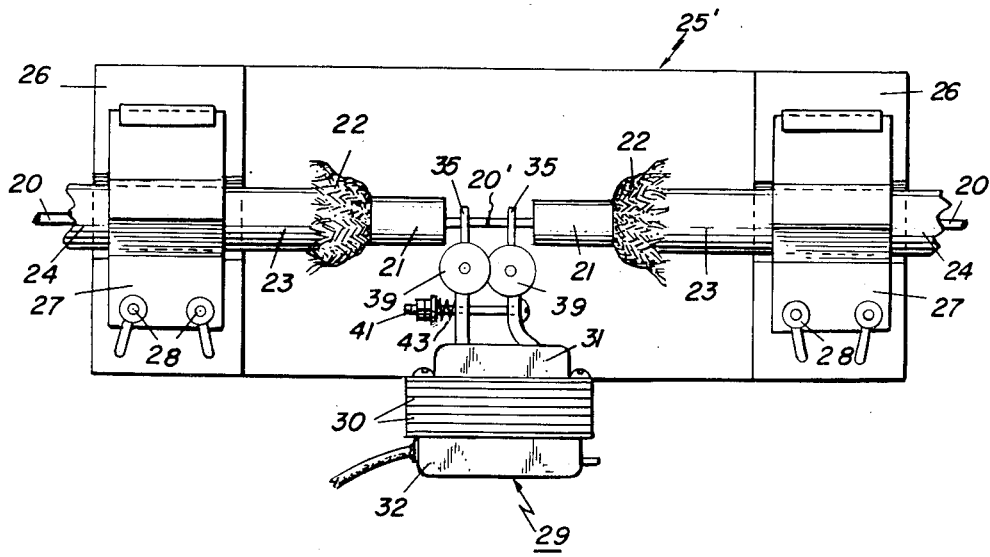

United States Patent Office 2,771,540
Patented Nov. 20, 1956

2,771,540

SOLDERING TRANSFORMER FOR SPLICING COAXIAL CABLES

Ray H. Dittmore, Milwaukee, Walther Richter, Whitefish Bay, Daniel Shadd and James A. McMillan, Milwaukee, and Russell W. Trickle, Jr., Janesville, Wis., assignors to Dittmore-Freimuth Corp., Milwaukee, Wis., a corporation of Wisconsin Original application June 28, 1954, Serial No. 439,752. Divided and this application February 1, 1955, Serial No. 485,404

6 Claims. (Cl. 219—85)

This invention is a division of our application Serial No. 439,752 filed June 28, 1954, for Method of and Means for Splicing Coaxial Cables. In that application there is disclosed a step of soldering the inner or central conductors of the cable ends to be spliced and a conductor heating transformer for use in the soldering operation.

The most commonly used coaxial cables have a braided outer conductor which surrounds and is spaced from a central conductor by a thermoplastic dielectric material such as polyethylene and which is surrounded by a thermoplastic protective sheath of polyvinyl or the like, the latter being in turn protected by at least one external sheath usually of lead. In the splicing of a high frequency cable of this type the primary consideration is to make such a splice that there will be no attenuation of the signal at the splice or any reflected waves traveling back to the source, from the splice. It is therefore important, as disclosed in our said application, to keep the splice as short as possible, to employ splicing materials as nearly as possible identical with the materials of the original cable, and to keep all dimensions and positions from the center of the cable through the inside diameter of the outer conductor as close as possible to those of the original. In the past the first step in the splicing of cable ends, was the soldering together of the abutted ends of the inner conductor and that was done by the use of a torch. The operation required considerable lengths of the two inner conductors to be bared in order that the heat would not damage the thermoplastic dielectric sheaths. In accordance with the present invention only the extreme end portions of the abutted conductor ends are heated by including them in the circuit of a transformer and hence only short lengths of the conductors need be bared, and the splice may be made much shorter with no danger of damaging the dielectric sheaths.

The object of the invention of this application is the provision of an improved electric heating transformer which will permit of the soldering or brazing of the inner conductor ends quickly and effectively by unskilled persons without damaging the thermoplastic or other insulating sheath surrounding the conductors.

In the accompanying drawings which show the present preferred embodiment of the invention:

Fig. 3 is an enlarged detail section taken on the line 3—3 in Fig. 1; and

Fig. 4 is a diagrammatic plan view showing cable lengths clamped in alinement on a stand or table with the jaws of the heating transformer applied to the inner conductor ends to be soldered together.

Figures 1, 2:
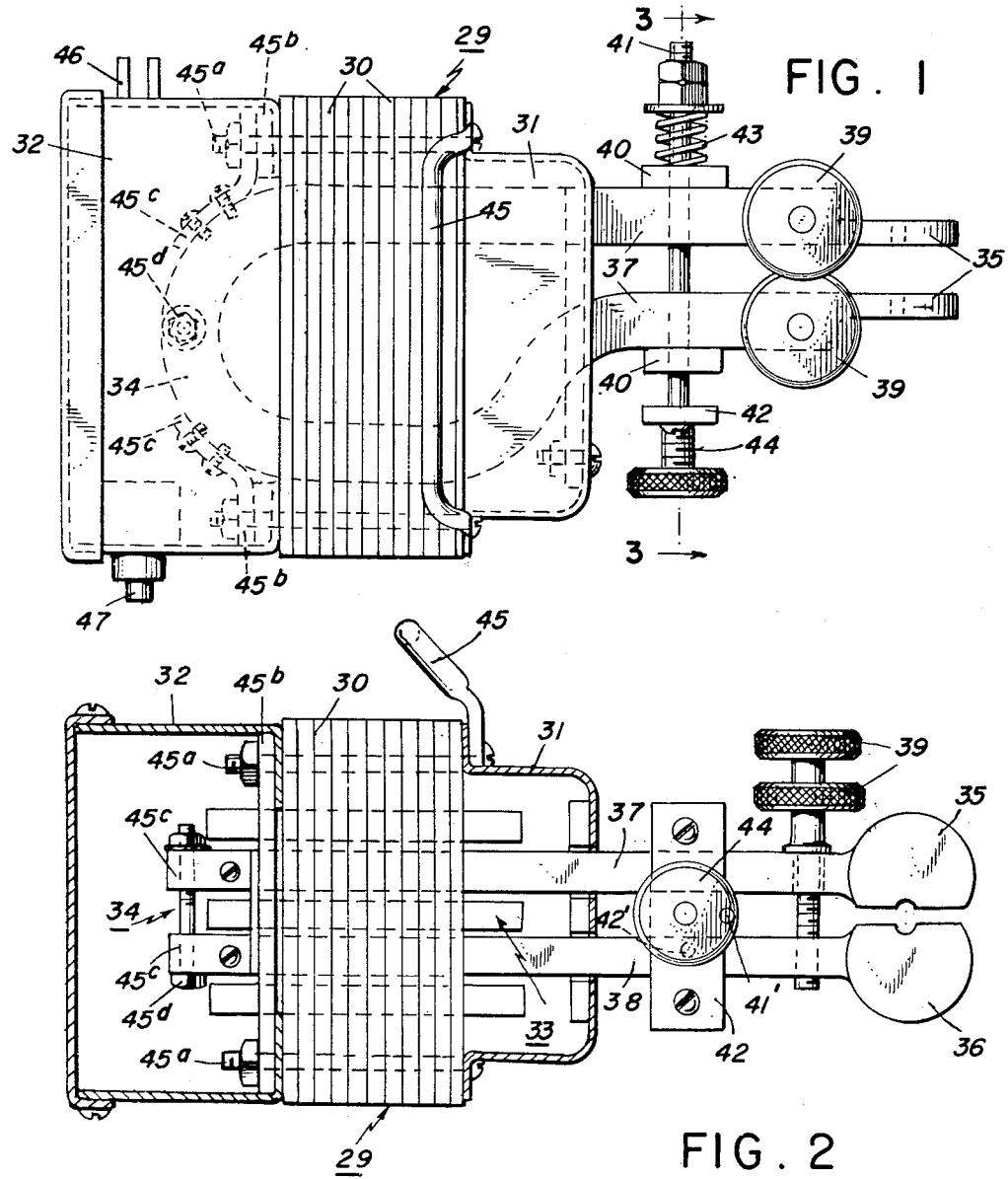
Fig. 1 is a top view of an electric heating transformer which is diagrammatically represented in Fig. 4.
Fig. 2 is a side elevation with parts in section.

Referring more in detail to the drawings the numeral 20 denotes the inner or central conductor of a coaxial cable, 21 the concentric polyethylene or similar dielectric sheath surrounding the inner conductor, 22 the outer braided conductor which is separated from the inner conductor by the sheath 21, 23 the polyvinyl or thermoplastic sheath surrounding the outer conductor and 24 the usual lead sheath surrounding the vinyl.

In Fig. 4, 25 represents a table having horizontally spaced raised portion 26 with alined transverse seats to receive the lead portions of the cable lengths. Clamp plates 27 with similar seats to receive the cables are detachably or hingedly held at one end and have clamping bolts 28 at their other ends to bind the cables in the opposed seats. Fig. 4 also shows diagrammatically the electric heating transformer 29, illustrated in Figs. 1–3, and positioned with its jaws clamped to the inner conductor ends and holding them in contact.

The transformer 29 comprises a body of laminations 30 with casing sections 31 and 32 suitably fastened on opposite sides, these parts enclosing primary coils 33 and a secondary winding 34 preferably consisting of two turns or loops connected in parallel and made of heavy copper bars terminating in outwardly projecting pairs of parallel and slightly flexible or springable arms which terminate in a pair of upper jaws 35 and a pair of opposed lower jaws 36, the two pairs of jaws being laterally spaced for clamping on the ends of the conductors 20. The upper jaws 35 are at the ends of arms 37 extending from one secondary turn, while the lower jaws 36 are at the ends of arms 38 extending from the other secondary turn, thus each pair of jaws constitutes one secondary turn but when clamped on the conductor, are effectively in parallel electrically. As seen in Fig. 1 the jaws are reduced in width to engage limited areas of the conductors, and the opposed gripping faces of the jaws have notches or seats to receive the conductors as seen in Fig. 2. Each jaw is also formed with an enlarged mass of copper which extends laterally away from the gripping edge and absorbs some of the heat generated in the conductor by the passage of the current. The jaws of each pair are moved toward each other to clamp the conductor end by a headed screw 39 rotatable in one arm 37 and screw threaded in the opposed arm 38. In order to maintain the conductor ends in contact during the heating operation the two pairs of jaws are yieldably urged toward each other by a spring tension means such as shown in Fig. 3. A pair of upright strips or plates of insulation 40 extend across the opposed arms and are fastened to the upper arms 37 and in their projecting ends are openings to slidably receive bolts 41. The heads of the latter are mounted in a metal plate 42 opposite one of the plates 40 and on the projecting threaded ends of the bolts are nuts and washers with coil springs 43 between the washers and the adjacent plate 40. A headed adjusting screw 44 is threaded through the center of the third plate 42 to thrust against the adjacent plate 40 to vary the tension of the springs. As seen in Fig. 3 coacting stop pins 41' and 42' on the head of screw 44 and on the plate 42 may be used to limit the rotation of the adjusting screw. A handle 45 in the form of a loop may be fastened to the body of the transformer by bolts 45ª which fasten the front and rear casings to the laminations and also fasten phenolic plates 45ᵇ in the casing 32. To these plates are fastened brace straps 45ᶜ which hold the secondary turns or bars. The latter are connected together by a bolt connection 45ᵈ. A conductor cord clamp 46 is mounted on one side of the casing 32 and a push button switch 47 on the other side to control the current to the primary.

After the prepared cable ends are clamped with the inner conductors in contact as shown in Fig. 4, the transformer is positioned as shown and the pairs of jaws clamped to the conductor ends by turning down the screws 39. The conductor ends are then pressed tightly together and held under tension by adjusting the screw 44. Silver solder flux is applied to the conductor joint and switch 47 is operated to pass a high current through the contacting conductor ends between the jaws. As soon as the joint is hot enough silver solder wire is applied onto the joint 20'. In the event that slight points on the conductor ends should soften under heat, the ends will move closer together, preventing the circuit from being broken. Any bulge in the soldered joint is trimmed off by a file or emery paper.

It will be noted that because of the structure described above, applicants have produced a simple and compact portable heating transformer which is especially adapted for soldering or brazing the abutted extremities of two conductors which have coverings of insulation extending close to their ends. The laminations 30 in connection with the casing sections 31 and 32, form a portable body or housing which encloses the primary and from which the yieldable terminal arms 37, 37 and 38, 38 project. In the illustrated embodiment, the secondary is formed by the two open loops made preferably of heavy copper bars, the closed ends of the loops being spaced and supported in the body by the parts 45ᵈ and 45ᵉ while the open ends of the loops form the first or upper pair of arms 37 and the second or lower pair 38. By thus constructing the arms they are resiliently yieldable laterally in directions at right angles to each other so that the upper and lower arms may be moved toward each other to cause the jaws at their ends to grip the conductors and the horizontally opposed arms of the two pairs may be simultaneously moved toward each other to hold the conductor ends in contact. By making the arms the split terminals of the secondary and making the jaws 35 and 36 integral with the arms, joints are eliminated so that there is less resistance to the circuit and there is better alinement of the jaws. The flattening of the outer ends of the arms provides the jaws with gripping edges that are narrow but maintains large masses of heat absorbing metal adjacent the heated conductor ends. The arrangement of parts also facilitates the use of the device since the jaws are at the ends of the arms.

What is claimed is:

1. In a transformer for use in soldering the abutting ends of axially alined lengths of electrical or electronic cable with the insulating sheaths on the conductors extending close to the ends of the latter, the combination of a portable body containing a primary winding, a split secondary winding associated with the latter and including a first pair of substantially parallel terminal arms and a second pair of substantially parallel terminal arms, the arms of the two pairs being in laterally opposed relation and all of said arms projecting out of the body and being resiliently yieldable in lateral directions at right angles to each other, a conductor clamping jaw at the outer extremity of each of said arms, said jaws being arranged in coacting pairs to grip the alined conductors between them, one pair of jaws being on each of the opposed arms of said first and second pairs, separate adjustable means between the laterally opposed arms of said first and second pairs to move the coacting jaws into gripping engagement with alined conductor ends, and spring means associated with the intermediate portions of all of said arms to bias the pairs of jaws toward each other to hold the gripped conductor ends in contact.

2. The structure of claim 1 in which said conductor clamping jaws have relatively narrow gripping edges to contact with only limited areas of the conductor ends, each of said jaws being enlarged in a lateral direction away from its gripping edge to provide a large mass of metal which causes the heat, generated in the conductor ends by the passage of the current, to be quickly absorbed and prevented from passing along the conductor to the insulating sheath on the latter.

3. The structure of claim 2 in which said secondary winding is made of heavy copper bar material and comprises two spaced parallel open loops, the closed ends of which are supported in said body, the open ends of said loops forming said first and second pairs of yieldable terminal arms.

4. The structure of claim 3 in which said conductor clamping jaws are integral with said arms and formed as flattened outer ends of the bars to provide the narrow gripping edges and the enlargements extending laterally away from the gripping edges.

5. The structure of claim 3 in which said spring means associated with all of said arms comprises a pair of laterally opposed plates of insulation extending across the outer faces of the laterally opposed arms of the two pairs and anchored to the arms of one pair, the projecting ends of the plates having alined bolt holes, a pair of parallel bolts slidable in the alined holes, a third plate connecting said bolts at one end and spaced from one of said insulating plates, nut means on the other ends of said bolts, springs on said bolts between the nut means and the adjacent insulating plate, and an adjusting screw threaded through said third plate and thrusting against the insulating plate.

6. The structure of claim 1 in which said secondary winding is made of heavy copper bar material and comprises two spaced parallel open loops, the closed ends of which are supported in said body, the open ends of said loops forming said first and second pairs of yieldable terminal arms.

References Cited in the file of this patent

UNITED STATES PATENTS

| | | |
|---|---|---|
| 347,141 | Thomson | Aug. 10, 1886 |
| 1,084,673 | Thomson | Jan. 20, 1914 |

FOREIGN PATENTS

| | | |
|---|---|---|
| 702,203 | Germany | Feb. 1, 1941 |